US009277452B1

(12) United States Patent
Aithal et al.

(10) Patent No.: US 9,277,452 B1
(45) Date of Patent: Mar. 1, 2016

(54) ADAPTIVE MODULATION AND PRIORITY-BASED FLOW CONTROL IN WIRELESS COMMUNICATIONS

(71) Applicant: Dragonwave, Inc., Kanata, Ontario (CA)

(72) Inventors: Prakasha Aithal, Kanata (CA); Brian Arthur Kay, Ottawa (CA)

(73) Assignee: Dragonwave, Inc., Ontario (CA)

( * ) Notice: Subject to any disclaimer, the term of this patent is extended or adjusted under 35 U.S.C. 154(b) by 23 days.

(21) Appl. No.: 13/789,137

(22) Filed: Mar. 7, 2013

(51) Int. Cl.
*H04L 12/56* (2006.01)
*H04L 5/12* (2006.01)
*H04L 12/26* (2006.01)
*H04W 28/10* (2009.01)

(52) U.S. Cl.
CPC .................... *H04W 28/10* (2013.01)

(58) Field of Classification Search
CPC . H04W 28/0284; H04W 28/10; H04W 16/04; H04L 12/4013; H04L 27/103; H04L 12/56; H04L 5/12; H04L 1/0021; H04L 2027/0097; H04L 25/03
USPC ......................................................... 370/235
See application file for complete search history.

(56) References Cited

U.S. PATENT DOCUMENTS 6,865,149 B1 * 3/2005 Kalman et al. ................ 370/225

7,068,660 B2    6/2006 Suni
(Continued)

FOREIGN PATENT DOCUMENTS

WO    WO 01/20829    3/2001

OTHER PUBLICATIONS

Mohamed L. Ammari, François Gagnon, Jean Belzile and Naïm Batani, Increasing the rate of wireless link when multiple QoS traffics are considered, 2004 IEEE 59th Vehicular Technology Conference. VTC 2004-Spring, May 17-19, 2004, pp. 1209-1212, vol. 2.
(Continued)

*Primary Examiner* — Curtis A Alia
*Assistant Examiner* — Vanneilian Lalchinthang
(74) *Attorney, Agent, or Firm* — McDonnell Boehnen Hulbert & Berghoff LLP

(57) ABSTRACT

Adaptive modulation and priority-based flow control in wireless communications are disclosed. Ingress communication traffic is modulated for transmission over a wireless communication link. A modulation rate of modulation to be applied to the ingress communication traffic is controlled by adaptive modulation. A rate at which the ingress communication traffic is received is controlled through Priority-based Flow Control (PFC), but the PFC is based on the adaptive modulation. Adaptive modulation and PFC are thus linked together. PFC messaging could be sent when a change in modulation rate due to the adaptive modulation would not meet the rate at which the ingress communication traffic is received. If a change in modulation rate due to the adaptive modulation would still meet the rate at which the ingress communication traffic is received, then PFC messaging might not be sent.

16 Claims, 4 Drawing Sheets

(56) References Cited

U.S. PATENT DOCUMENTS

| | | |
|---|---|---|
| 7,414,965 B2 * | 8/2008 | Wolf et al. .................... 370/216 |
| 7,813,356 B2 | 10/2010 | Roberts |
| 7,916,626 B2 | 3/2011 | Smith et al. |
| 8,125,910 B2 * | 2/2012 | Shimonishi et al. .......... 370/236 |
| 2006/0165091 A1 * | 7/2006 | Arima et al. ............. 370/395.21 |
| 2006/0165190 A1 * | 7/2006 | Tamaki et al. ................ 375/262 |
| 2006/0209686 A1 * | 9/2006 | Wigard et al. ................ 370/229 |
| 2006/0269066 A1 * | 11/2006 | Whitehead et al. ........... 380/270 |
| 2008/0056192 A1 * | 3/2008 | Strong et al. ................. 370/331 |
| 2010/0214980 A1 | 8/2010 | Vanunu et al. |
| 2011/0170419 A1 | 7/2011 | Zhang et al. |
| 2012/0287786 A1 * | 11/2012 | Kamble et al. ................ 370/235 |

OTHER PUBLICATIONS

Jalil Seifali Harsini and Michele Zorzi, Effective Capacity Analysis for Multi-Rate Relay Channels Exploiting Adaptive Cooperative Diversity, ICC 2011—2011 IEEE International Conference on Communications, Jun. 5-9, 2011, 6 pages.

Rony Kowalski, The Benefits of Dynamic Adaptive Modulation for High Capacity Wireless Backhaul Solutions, Ceragon Networks Oct. 2007, pp. 1-6, http://www.ceragon.com/files/The%20Benefits%20of%20Dynamic%20Adaptive%20Modulation.pdf.

* cited by examiner

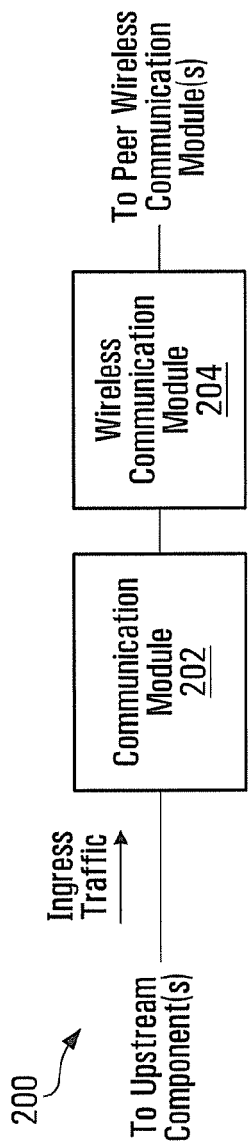
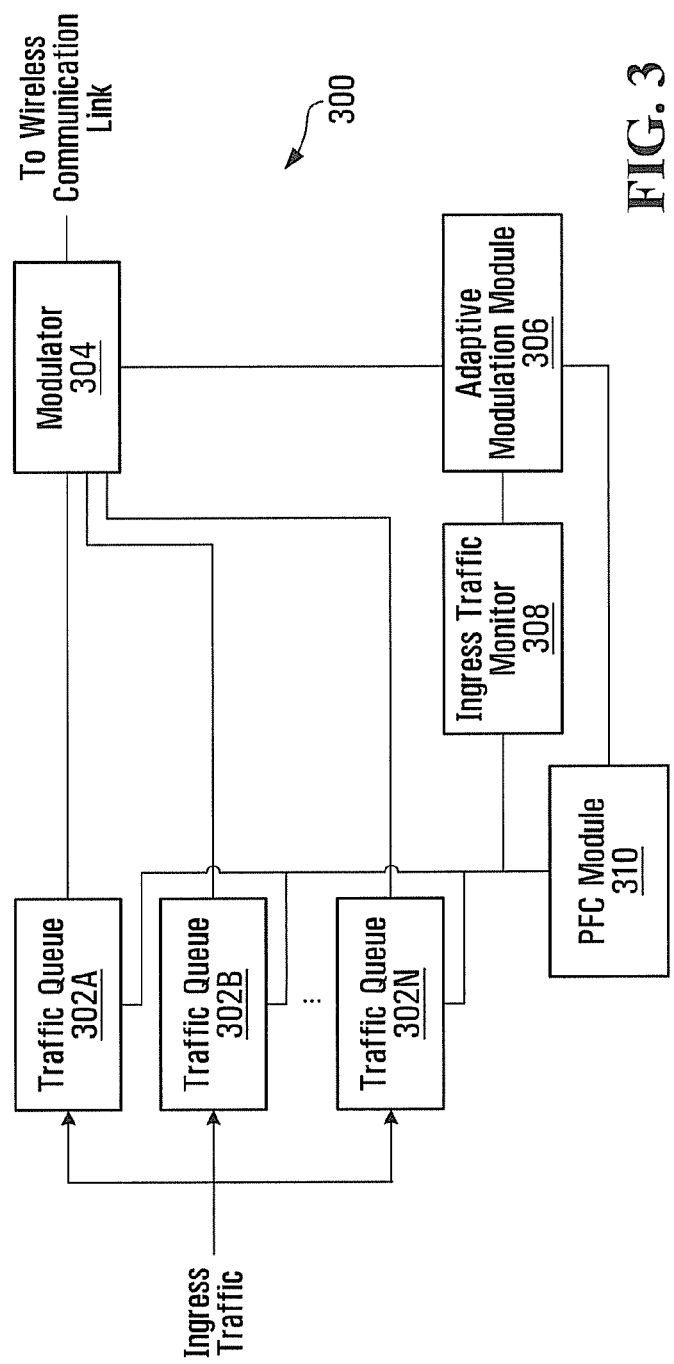

ADAPTIVE MODULATION AND PRIORITY-BASED FLOW CONTROL IN WIRELESS COMMUNICATIONS

FIELD OF THE INVENTION

This invention relates generally to wireless communications and, in particular, to linking Priority-based Flow Control (PFC) with adaptive modulation.

BACKGROUND

In wireless telecommunications, technology like modulation and demodulation are used to transfer data from one location to another location over the air, using allocated frequency spectrum. The wireless industry has developed Adaptive Coding and Modulation (ACM), for example, to contend with changing over-air conditions on wireless communication links. The higher the modulation rate, the higher the over-air throughput. When over-air conditions deteriorate, the Signal-to-Noise Ratio (SNR) deteriorates, and modulation shifts to a lower modulation rate. The lower modulation rate provides a higher wireless system gain, which in turn provides higher immunity to the deteriorated over-air conditions. A resultant boost in SNR to maintain the over-air wireless communication link comes at the cost of reduced over-air bandwidth or data throughput due to the lower modulation rate.

Ethernet traffic class, for example, is identified by Virtual Local Area Network (VLAN) tag priority values (Institute of Electrical and Electronics Engineers (IEEE) standard 802.1p). PFC in accordance with IEEE standard 802.1Qbb, for example, is intended to eliminate frame loss due to congestion. This is achieved by a mechanism similar to the IEEE 802.3x PAUSE, but operating on individual Class of Service as defined by IEEE 802.1p.

SUMMARY

According to an aspect of the present disclosure, an apparatus includes: a modulator to modulate ingress communication traffic for transmission over a wireless communication link; an adaptive modulation module, operatively coupled to the modulator, to control a modulation rate of modulation to be applied to the ingress communication traffic by the modulator; a PFC module, operatively coupled to the adaptive modulation module, to control a rate at which the ingress communication traffic is received, based on a control input received from the adaptive modulation module.

The apparatus could also include: an ingress traffic monitor, operatively coupled to the adaptive modulation module, to monitor the rate at which the ingress communication traffic is received, and to determine whether a modulation rate of the modulation to be applied to the ingress communication traffic by the modulator meets the rate at which the ingress communication traffic is received.

Where the ingress communication traffic is stored in traffic queues, the ingress traffic monitor could be configured to monitor the rate at which the ingress communication traffic is received by monitoring fill levels of the plurality of traffic queues.

The adaptive modulation module is configured in some embodiments to provide the control input to the PFC module to cause the PFC module to transmit PFC messaging to an upstream communication component from which the ingress traffic is received, responsive to a determination by the ingress traffic monitor that the modulation rate of the modulation to be applied to the ingress communication traffic by the modulator does not meet the rate at which the ingress communication traffic is received. The PFC module could transmit the PFC messaging to cause the upstream communication component to reduce a rate at which it sends ingress traffic associated with one or more particular traffic queues.

The adaptive modulation module could be configured to also or instead provide the control input to the PFC module to prevent the PFC module from transmitting PFC messaging to an upstream communication component from which the ingress traffic is received, responsive to a determination by the ingress traffic monitor that the modulation rate of the modulation to be applied to the ingress communication traffic by the modulator meets the rate at which the ingress communication traffic is received.

The adaptive modulation module could be configured to control the modulation rate to be any of multiple different modulation rates supported by the modulator, in which case the ingress traffic monitor could be further configured to predict whether any of the plurality of modulation rates would not meet the rate at which the ingress communication traffic is received, and adaptive modulation module could be further configured to provide the control input to the PFC module to cause the PFC module to transmit PFC messaging to an upstream communication component from which the ingress traffic is received, responsive to a determination that the modulation rate to be applied to the ingress communication traffic by the modulator is a modulation rate that the ingress traffic monitor predicts would not meet the rate at which the ingress communication traffic is received.

The ingress communication traffic could include traffic respectively associated with multiple priorities, including one or more higher priorities and one or more lower priorities. The PFC module could be configured to control a rate at which ingress traffic associated with the one or more lower priorities is received, in order to reduce jitter in ingress traffic associated with the one or more higher priorities.

Wireless communication network equipment could include such an apparatus, a wireless communication module that includes the modulator, and a communication module, operatively coupled to the wireless communication module, to enable receipt of the ingress communication traffic over a further communication link. In an embodiment, the further communication link is an Ethernet communication link.

The wireless communication module could also include the adaptive modulation module and the PFC module.

A method is also provided, and involves: modulating ingress communication traffic for transmission over a wireless communication link; applying adaptive modulation to control a modulation rate of modulation to be applied to the ingress communication traffic; applying PFC to control a rate at which the ingress communication traffic is received, based on the adaptive modulation.

The method could also involve: monitoring the rate at which the ingress communication traffic is received; determining whether a modulation rate of the modulation to be applied to the ingress communication traffic meets the rate at which the ingress communication traffic is received.

In an embodiment, the method further involves storing the ingress communication traffic in traffic queues, in which case the monitoring could involve monitoring fill levels of the traffic queues.

The applying PFC based on the adaptive modulation could involve transmitting PFC messaging to an upstream communication component from which the ingress traffic is received, responsive to a determination that the modulation rate of the modulation to be applied to the ingress communication traffic does not meet the rate at which the ingress communication traffic is received.

The applying PFC based on the adaptive modulation could also or instead involve preventing transmission of PFC messaging to an upstream communication component from which the ingress traffic is received, responsive to a determination that the modulation rate of the modulation to be applied to the ingress communication traffic meets the rate at which the ingress communication traffic is received.

Where the ingress communication traffic is stored in traffic queues, the transmitting could involve transmitting the PFC messaging to cause the upstream communication component to reduce a rate at which it sends ingress traffic associated with one or more particular traffic queues of the plurality of traffic queues.

In an embodiment, the applying adaptive modulation involves controlling the modulation rate to be any of multiple different modulation rates. The method could then include: predicting whether any of the plurality of modulation rates would not meet the rate at which the ingress communication traffic is received, in which case the applying PFC based on the adaptive modulation could involve transmitting PFC messaging to an upstream communication component from which the ingress traffic is received, responsive to a determination that the modulation rate to be applied to the ingress communication traffic is a modulation rate that is predicted not to meet the rate at which the ingress communication traffic is received.

The method could also involve receiving the ingress communication traffic over a further communication link, illustratively an Ethernet communication link.

The ingress communication traffic could include traffic respectively associated with any of multiple priorities, including one or more higher priorities and one or more lower priorities. The applying PFC could then involve controlling a rate at which ingress traffic associated with the one or more lower priorities is received, in order to reduce jitter in ingress traffic associated with the one or more higher priorities.

Such a method could be embodied, for example, in instructions stored in or on a non-transitory computer-readable medium storing, which when executed, perform the method.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 2 is a block diagram of an example of wireless communication network equipment.

FIG. 3 is a block diagram of an example apparatus.

DETAILED DESCRIPTION

Figure 1:
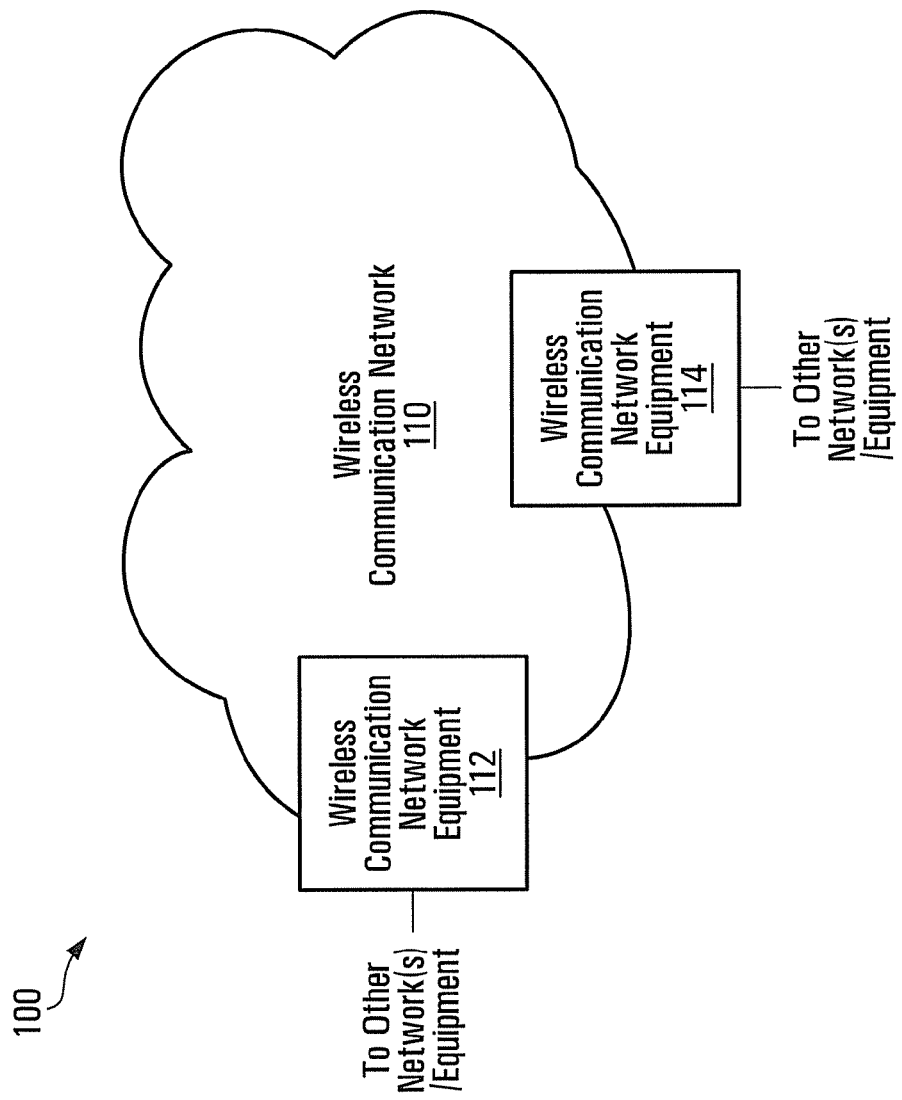
FIG. 1 is a block diagram of an example communication system.

With wireless telecommunication, over-air throughput is affected by such factors as weather conditions, multi-path propagation, etc. When weather conditions deteriorate, for example, it might be desirable to shift to a lower modulation rate in order to boost SNR. Such a shift in modulation rate could be made through adaptive modulation, in which modulation and/or coding used in preparing traffic for wireless transmission adapts to changes in wireless communication link conditions. Changes in modulation, coding, or both could result in changes in overall effective modulation rate. Thus, modulation and modulation rates could encompass processing and rates associated with modulation alone or in combination with coding.

If adaptive modulation, illustratively a hitless automatic adaptive modulation approach or Adaptive Coding and Modulation (ACM) as developed by the wireless industry for instance, is not enabled, then a switch to a lower modulation rate may result in loss of traffic, as a wireless modem would typically re-negotiate wireless communication parameters with its peer wireless modem, and reacquire the wireless communication link or channel. Even if PFC is employed in a wireless communication link that does not support adaptive modulation or for which adaptive modulation is turned off or not enabled, frame loss may occur and could affect anywhere from a few frames to many frames, regardless of priority level.

PFC in itself cannot be guaranteed to eliminate frame loss when a modulation shift (up or down) occurs. However, PFC in combination with adaptive modulation, where PFC and adaptive modulation are linked as disclosed herein, could reduce the number of ingress traffic stoppages, and thus introduce less Ethernet traffic jitter in a network.

Without linking PFC with adaptive modulation, there could be issues with handling ingress traffic due to modulation downshifting to lower modulation. For example, although adaptive modulation could be designed to be hitless so that traffic is not dropped by a wireless modem during a modulation shift, a lower over-air throughput due to a lower modulation rate after a shift could result in ingress traffic building up in traffic queues and subsequently being dropped. PFC would eventually initiate flow control messaging with an upstream component from which the ingress traffic is received, to throttle down the ingress traffic rate, but this might not entirely avoid traffic loss.

In order to eliminate such ingress traffic loss, redundant parallel links could be set up to direct duplicated traffic streams to the intended end points. This wastes resources in that typically a second radio frequency, or an entirely different network path spanning different geographical regions, would be would used and paid for. An alternate radio band or network path might not be feasible, in that a license for a second radio channel might not be available, or a second network path might not be available. A second radio band and/or an alternate network path could also increase deployment costs for a network operator.

Another possible traffic handling issue that might arise even in systems that include both PFC and adaptive modulation is that, following a modulation rate downshift by adaptive modulation and until PFC signals the upstream component to reduce the ingress traffic rate, the wireless modem might continue to send all priorities or classes of ingress traffic within its now lower over-air throughput. Again, PFC would eventually initiate flow control messaging with the upstream component to throttle down the ingress traffic rate, but until this happens lower priority traffic could still be sent on the wireless link even though the lower modulation rate might ideally be substantially or even entirely dedicated to sending higher priority traffic until over-air conditions improve. Continued servicing of lower priority traffic can result in undesirable jitter in the higher priority traffic.

Linking PFC and adaptive modulation, as disclosed herein, can mitigate the effects of these types of traffic loss and traffic handling issues. With such linking, PFC actions could then be taken, or in some circumstances not taken, based on adaptive modulation events.

Also, without linking PFC and adaptive modulation, there can be increased network jitter not only due to downspeed events on modem modulation changes, but also or instead due to upspeed events. By tying PFC with adaptive modulation, less jitter is introduced in the network. Thus, there is less jitter on higher priority traffic, which typically has higher revenue associated with it (voice, video, etc).

FIG. 1 is a block diagram of an example communication system 100, which includes a wireless communication network 110. The wireless communication network 110 includes wireless communication network equipment 112, 114, also generally referred to as nodes. These installations of wireless communication network equipment 112, 114 communicate with each other through wireless communication links. Each installation of wireless communication network equipment 112, 114 may also communicate with other networks and/or equipment, such as Ethernet networks, user equipment, etc., through other communication links which could be wired or wireless communication links. Although a wireless communication network may include many installations of wireless communication network equipment, only two such equipment installations are shown in FIG. 1 at 112, 114 to avoid congestion in the drawing. It should be appreciated that the example system 100 of FIG. 1, as well as the contents of the other drawings, are intended solely for illustrative purposes, and that the present disclosure is in no way limited to the particular example embodiments explicitly shown in the drawings and described herein.

Wireless communications between the wireless communication network equipment 112, 114 may be affected by weather conditions, multi-path propagation, and/or possibly other factors. Deteriorating weather conditions, for example, might increase the error rate on a wireless communication link between the wireless communication network equipment 112, 114, and result in an adaptive modulation downshift to a lower modulation rate at the sending equipment. Adaptive modulation could be applied not only to wireless communication links between network equipment such as 112, 114, but also or instead to wireless communication links between network equipment and subscriber equipment, for example.

FIG. 2 is a block diagram of an example of wireless communication network equipment. The example wireless communication network equipment 200 includes a communication module 202 and a wireless communication module 204, operatively coupled together in one embodiment as shown. Wireless communication network equipment in which PFC and adaptive modulation features are provided could include additional components. FIG. 2 represents a non-limiting example of wireless communication network equipment.

In general, hardware, firmware, components which execute software, or some combination thereof might be used in implementing the communication module 202 and the wireless communication module 204. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

The communication module 202 and the wireless communication module 204 generally represent components that enable the example wireless communication network equipment 200 to communicate with other equipment or components. For example, the wireless communication module 204 might include an antenna and transceiver circuitry for processing communication signals that are to be transmitted or are received over a wireless communication link. Its structure would be dependent upon the type(s) of wireless communication link(s) over which communications are to be supported. Similarly, the structure of the communication module 202 is implementation-dependent, but in general it includes receive and/or transmit circuitry and an interface to a communication medium. In an embodiment, the wireless communication module 204 supports communications over a microwave communication link, and the communication module 202 supports communications over a wired communication link, illustratively an Ethernet link.

FIG. 3 is a block diagram of an example apparatus 300, which includes N traffic queues 302A, 302B, . . . , 302N, a modulator 304, an adaptive modulation module 306, an ingress traffic monitor 308, and a PFC module 310, coupled together as shown in one embodiment. Although FIG. 3 shows the traffic queues 302A, 302B, . . . , 302N coupled to the modulator 304, it should be appreciated that this is solely for the purposes of illustration. There could be other intermediate components, such as a traffic schedulers for instance, between the traffic queues 302A, 302B, . . . , 302N and the modulator 304. In another embodiment, the modulator 304 could handle scheduling of traffic from the traffic queues 302A, 302B, . . . , 302N.

The types of interconnections through which the components shown in FIG. 3 are operatively coupled together may be at least in part implementation-dependent. For example, some or all of the components in FIG. 3 could be part of a wireless communication module such as a wireless modem. Interconnections could then be through printed circuit board (PCB) traces, connectors, and/or other types of physical connections. In an embodiment, features of the adaptive modulation module 306, the ingress traffic monitor 308, and the PFC module 310 are implemented in hardware that executes software. A processor in a wireless communication module, for example, could be configured to execute adaptive modulation, ingress monitor, and PFC software stored in a non-transitory processor-readable medium (not shown). An operative coupling between these components could then be in the form of a communication mechanism, protocol, or interface between the components, and/or one or more shared memory locations, variables, and/or registers, for example.

At least the modulator 304, the adaptive modulation module 306, the ingress traffic monitor 308, and the PFC module 310 could be implemented in hardware, firmware, components which execute software, or some combination thereof. Examples of electronic devices that might be suitable for implementing any or all of these components include are provided above.

The traffic queues 302A, 302B, . . . , 302N are provided in memory that includes one or more physical memory devices. In an embodiment, a respective traffic queue 302A, 302B, . . . , 302N is provided for each of N traffic priorities or classes, and incoming ingress traffic is stored to the traffic queue corresponding to its priority or class. Solid-state memory devices such as a Flash memory device, and/or memory devices with movable or even removable storage media, could be implemented. In an embodiment, the memory in which the traffic queues 302A, 302B, . . . , 302N are stored is a dedicated memory device for storing ingress traffic, although in other embodiments the traffic queues could be implemented as addresses or locations in memory that is also used for other purposes. Additional memory space could be provided in the same memory device(s) or separately from the traffic queues 302A, 302B, . . . , 302N to store software for execution to provide features of the modulator 304, adaptive modulation module 306, the ingress traffic monitor 308, the PFC module 310, and/or possibly other components of wireless communication equipment in which or in conjunction with which the example apparatus 300 is implemented.

The modulator 304 represents a component that modulates ingress traffic for transmission over a wireless communication link. Any of various modulation types could be applied to ingress traffic, and the physical structure of the modulator 304 could be at least in part implementation-dependent. In an embodiment, the modulator 304 is part of a wireless modem.

Adaptive modulation features could be integrated into a wireless communication module such as a wireless modem as well. The adaptive modulation module 306 is shown separately from the modulator 304 in FIG. 3 for illustrative purposes and ease of reference. However, the adaptive modulation module 306 and the modulator 304 could be part of the same physical component, such as a wireless modem, and implemented using hardware that executes adaptive modulation software for example.

Similarly, the ingress traffic monitor 308 and/or the PFC module 310 might also be integrated into the same wireless communication module as the modulator 304 and the adaptive modulation module 306. A processing element could execute software that provides features of the ingress traffic monitor 308 and a PFC engine as the PFC module 310, for example. The same processing element could execute software that provides features of the modulator 304, the adaptive modulation module 306, the ingress traffic monitor 308, and the PFC module 310, or multiple processing elements could be provided. The electronic devices noted above are non-limiting examples of processing elements that could be used for this purpose.

In operation, the modulator 304 modulates ingress communication traffic for transmission over a wireless communication link. The adaptive modulation module 306, which as shown in FIG. 3 is operatively coupled to the modulator 304, controls a modulation rate of modulation to be applied to the ingress communication traffic by the modulator. The PFC module 310 is operatively coupled to the adaptive modulation module 306, and controls a rate at which the ingress communication traffic is received. According to an aspect of the present disclosure, this ingress communication traffic rate control by the PFC module 310 is based on a control input received from the adaptive modulation module 306. Adaptive modulation is thereby linked with PFC.

The ingress traffic monitor 308 is operatively coupled to the adaptive modulation module 306, and monitors the rate at which the ingress communication traffic is received. In an embodiment, the ingress traffic monitor also determines whether a modulation rate of the modulation to be applied to the ingress communication traffic by the modulator 304 meets the rate at which the ingress communication traffic is received, or in other words whether the associated wireless bandwidth at the modulation rate is sufficient to service the ingress traffic for transmission.

As shown in FIG. 3, the ingress communication traffic could be stored in traffic queues 302A, 302B, . . . , 302N. The ingress traffic monitor 308 could then be configured to monitor the rate at which the ingress communication traffic is received by monitoring fill levels of the traffic queues 302A, 302B, . . . , 302N. Queue fill level monitoring could employ an "active" or "passive" monitoring approach. For example, in an active approach, the ingress traffic monitor 308 might access each traffic queue 302A, 302B, . . . , 302N to determine its fill level, whereas in a passive approach the ingress traffic monitor could register with the traffic queues 302A, 302B, . . . , 302N to receive updates on fill levels. Queue fill levels could be in the form of absolute fill levels indicating the amount of space that is occupied and/or unoccupied in each traffic queue 302A, 302B, . . . , 302N, and/or relative fill levels indicating the fill level of each queue relative to its size such as a percentage or ratio of fill level relative to queue size for each queue. A traffic queue 302A, 302B, . . . , 302N could also or instead be configured to provide the ingress traffic monitor 308 with an alert when its fill level reaches one or more thresholds. The PFC module 310 also monitors queue fill levels to make flow control decisions, and in an embodiment the ingress traffic monitor 308 receives queue fill level information from the PFC module. Thus, any of various mechanisms could be implemented to enable the ingress traffic monitor 308 to monitor the ingress communication traffic rate.

Responsive to a determination by the ingress traffic monitor 308 that the modulation rate of the modulation to be applied to the ingress communication traffic by the modulator 304 does not meet the rate at which the ingress communication traffic is received, the adaptive modulation module 306 provides the control input to the PFC module 310 to cause the PFC module to transmit PFC messaging to an upstream communication component from which the ingress traffic is received. The PFC messaging itself could be in accordance with existing standards/protocols, to in turn cause the upstream or sending communication component to throttle back the rate at which it is sending the ingress communication traffic. This overall PFC mechanism, in which a control input for PFC is provided from adaptive modulation, however departs from normal PFC processing in that PFC is linked with adaptive modulation. Examples of existing standards or protocols for PFC messaging include IEEE 802.1Qbb and IEEE 802.3bd.

Adaptive modulation/PFC linking need not only initiate PFC messaging by the PFC module 310. For example, if the modulation to be applied to the ingress communication traffic by the modulator 304 meets the rate at which the ingress communication traffic is received, then there would be no need to invoke PFC messaging. Therefore, in an embodiment, the adaptive modulation module 306 is configured to provide the control input to the PFC module 310 to prevent the PFC module from transmitting PFC messaging to an upstream communication component from which the ingress traffic is received, responsive to a determination by the ingress traffic monitor 308 that the modulation rate of the modulation to be applied to the ingress communication traffic by the modulator 304 meets the rate at which the ingress communication traffic is received.

PFC messaging is queue-specific in some embodiments. In the example apparatus 300, ingress communication traffic is stored in the traffic queues 302A, 302B, . . . , 302N. The PFC module 310 could then transmit the PFC messaging to cause the upstream communication component to reduce a rate at which it sends ingress traffic associated with one or more particular traffic queues of the plurality of traffic queues.

The ingress communication traffic could include traffic of any of multiple priorities. These priorities could include one or more higher priorities and one or more lower priorities. In this case, the PFC module 310 could transmit the PFC messaging to cause the upstream communication component to reduce a rate at which it sends ingress traffic associated with the one or more lower priorities, thereby introducing less jitter on the traffic associated with the one or more higher priorities.

In many modulation schemes, there are a finite number of modulation rates. Thus, the adaptive modulation module 306 might be configured to control the modulation rate to be any of a number of different modulation rates that are supported by the modulator 304. The ingress traffic monitor 308 could then be further configured to predict whether any of these modulation rates would not meet the rate at which the ingress communication traffic is received. Responsive to a determination that the modulation rate to be applied to the ingress communication traffic by the modulator 304 is a modulation rate that the ingress traffic monitor 308 predicts would not meet the rate at which the ingress communication traffic is currently being received, the adaptive modulation module 306 could provide the control input to the PFC module 310 to cause the PFC module to transmit PFC messaging to an upstream communication component from which the ingress traffic is received.

This control input could be provided prior to the change in modulation rate actually being made. For example, based on the rate at which ingress communication traffic is currently being received, the ingress traffic monitor 308 might predict that a change from the highest to the second-highest modulation rate would be insufficient to service all ingress communication traffic. The adaptive modulation module 306 could provide the control input to the PFC module 310 when it determines that modulation is to shift from the highest to the second-highest modulation rate. The control input is then provided responsive to a modulation rate shift decision or determination, before the modulation rate shift is actually made or even signalled to the modulator 304 by the adaptive modulation module 306. In other embodiments, the ingress traffic monitor 308 makes its determination as to whether the modulation rate to be applied meets the ingress traffic rate after the modulation rate shift decision has been made by the adaptive modulation module 306, and the control signal is subsequently provided to the PFC module 310. In this case, the control signal could be provided to the PFC module 310 after the modulation rate shift has been signalled to the modulator 304.

The ingress communication traffic could include traffic respectively associated with any of multiple priorities, including one or more higher priorities and one or more lower priorities. In an embodiment, the PFC module 310 is configured to control a rate at which ingress traffic associated with the one or more lower priorities is received, in order to reduce jitter in ingress traffic associated with the one or more higher priorities.

The example apparatus 300 could be implemented in wireless communication network equipment. Such equipment could also include a wireless communication module such as 204 in FIG. 2, and the modulator 304 could actually be part of that wireless communication module. The wireless communication module might include one or more of the other components shown in FIG. 3 as well. Wireless communication network equipment could also include a communication module such as 202 in FIG. 2, operatively coupled to the wireless communication module, to enable receipt of the ingress communication traffic over a further communication link. In an embodiment, this further communication link is an Ethernet communication link.

Figure 4:
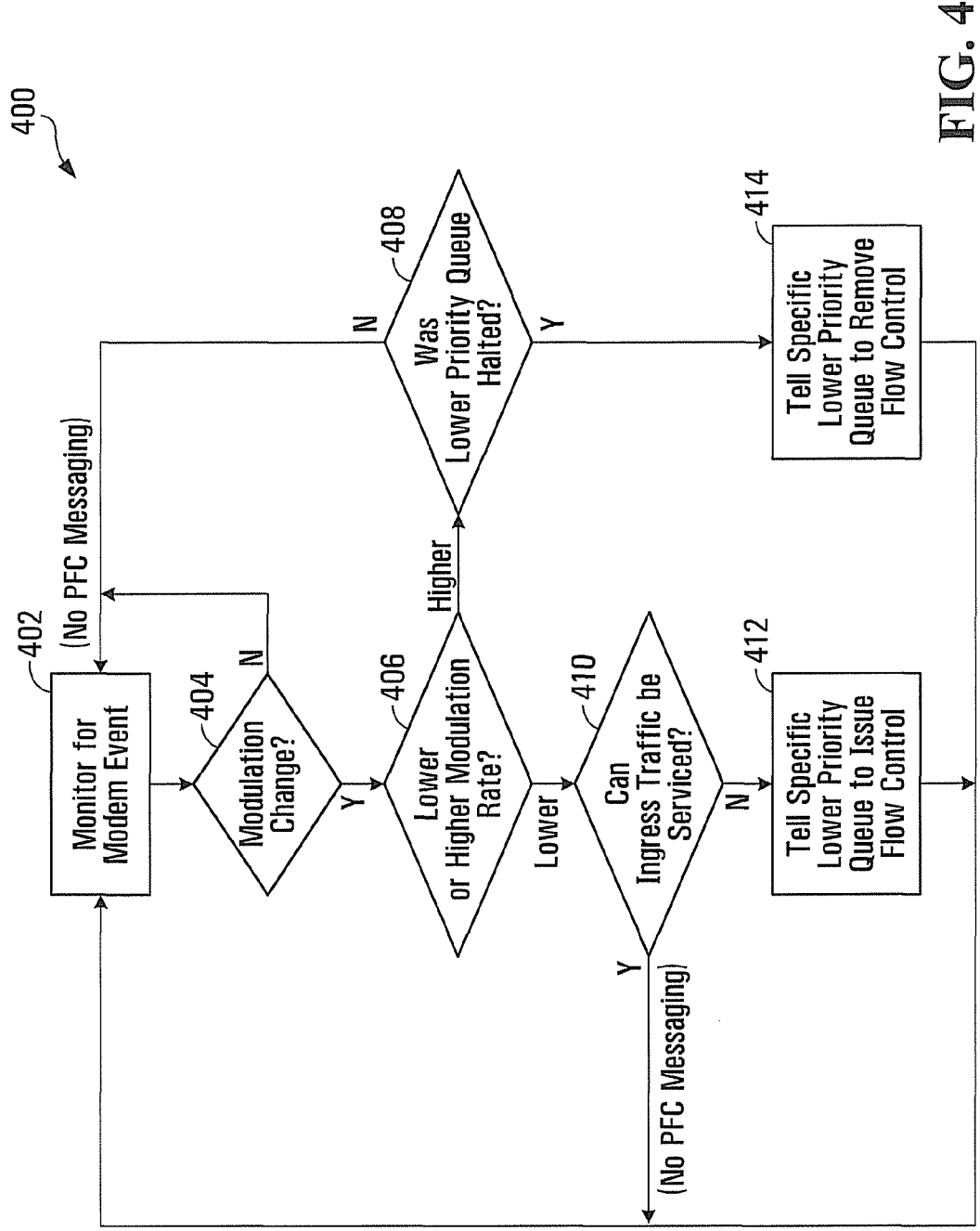
FIG. 4 is a flow diagram of an example method.

FIG. 4 is a flow diagram of an example method 400, which involves monitoring for a modem event at 402. Examples of modem events include, but are not limited to:
1. User change of maximum bandwidth of the wireless communication link
2. Rain and/or other point to point path impairments
3. Tower sway and misalignment of wireless communication network equipment with its peer wireless communication network equipment
4. Multipath fading.

This monitoring relates to adaptive modulation, in the context of a modulator that is part of a modem in this example. On detection of a modem event at 402, a determination is made at 404 as to whether a modulation change is to be made. If not, then the modulation rate will not be changing, and no PFC messaging is required. The example method 400 returns to the monitoring at 402.

At 406, if there will be a modulation change, a determination is made as to whether the modulation rate will be shifting lower or higher. A shift to a higher modulation rate increases throughput, and it might be possible to remove rate limiting or flow control that has been initiated for certain traffic queues/priorities. At 408, a determination is made as to whether a lower priority queue was previously halted, due to the current modulation rate (before the change) being insufficient to provide a Committed Information Rate (CIR) for communication traffic associated with that queue for instance. If a lower priority queue was not halted, then no PFC messaging is needed, and processing returns to 402. Flow control for a previously halted queue could be removed at 414 by instructing the queue, or more specifically a PFC engine or other form of PFC module, to remove the flow control. Processing then returns to 402.

For a shift to a lower modulation rate, a determination is made at 410 as to whether ingress traffic can still be serviced. If so, then no PFC messaging is needed, and processing returns to 402. In this case, and others in which no PFC messaging is to be sent to an upstream communication component, a control input could be provided to a PFC module to prevent PFC messaging from being sent.

When modulation is to shift to a lower rate and ingress traffic cannot be serviced, PFC messaging is initiated at 412 to establish flow control for one or more specific lower priority queues. A control input could be provided to each queue or to a PFC module, and processing then returns to 402.

In the example method 400, when adaptive modulation downshifts, a momentary pause in traffic occurs, hitless in nature. The momentary pause in traffic is absorbed by the traffic queues. When the downshift is completed, traffic transmission over the wireless communication link continues. PFC messaging on a modulation downspeed might only be sent when a lower priority queue is full and the CIR cannot be met, for example.

Figure 5:
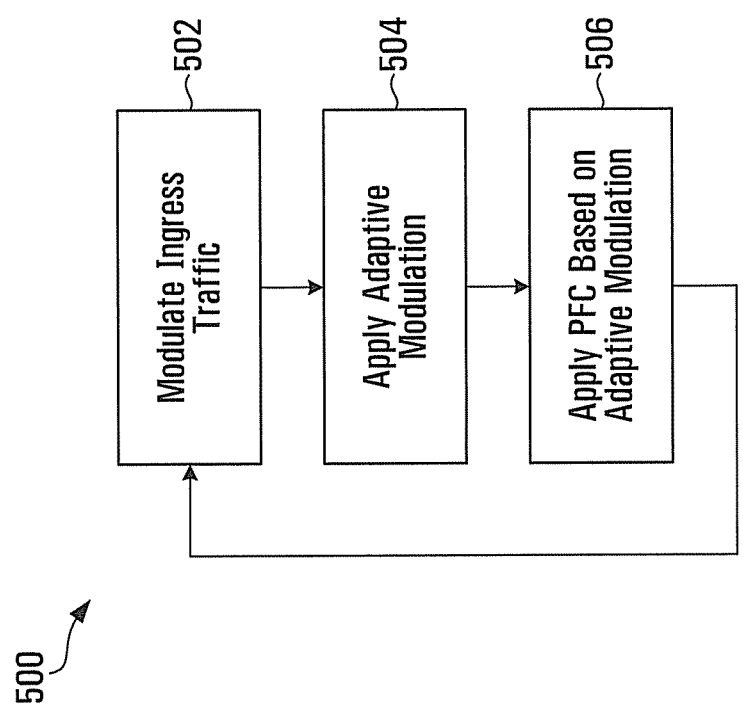
FIG. 5 is a flow diagram of another example method.

FIG. 5 is a flow diagram of another example method 500, which involves modulating ingress communication traffic at 502 for transmission over a wireless communication link, applying adaptive modulation at 504 to control a modulation rate of modulation to be applied to the ingress communication traffic, and applying PFC at 506, based on the adaptive modulation, to control a rate at which the ingress communication traffic is received. The example method 500 is illustrative of one embodiment. Examples of additional operations that may be performed, such as monitoring ingress traffic rate, determining whether a modulation rate to be applied to the ingress traffic meets the ingress traffic rate, predicting whether modulation rates would not meet the ingress traffic rate, and transmitting or preventing transmission of PFC messaging depending on the determination or prediction, will be apparent from the description and drawings relating to apparatus and system implementations, for example. Further variations may be or become apparent.

Adaptive modulation in conjunction with PFC could potentially eliminate frame loss on wireless communication links for all priority levels of traffic when the wireless bandwidth available can meet the current Ethernet input frame rate. Queue levels for the traffic classes can be monitored as disclosed herein to determine whether the current wireless bandwidth meets the current ingress rate, illustratively Ethernet frame rate. In an embodiment, ingress monitoring continues, and queue levels are compared to all available modulation levels and associated wireless bandwidth, and the modulation levels at which lower priority traffic could be affected may be predicted.

Adaptive modulation in conjunction with PFC might also eliminate frame loss on wireless communication links for higher priority traffic, at the expense of lower priority traffic when the CIR cannot be met for lower priority traffic, for example.

Because adaptive modulation is hitless in some embodiments, there are no frame losses over the air. This in itself could remove a need to proactively halt ingress traffic via PFC messaging when a loss of modem synchronization occurs. In other words, if adaptive modulation were not tied to PFC, a wireless communication link that experiences loss of mod sync would normally issue PFC messages on all queues to halt ingress traffic, until the wireless communication link is restored.

Adaptive modulation in conjunction with PFC can reduce the number of PFC messages to upstream equipment such as a subtending switch, across all priority levels, thus introducing less jitter in a network. If the current CIR for a traffic queue can be met when a modulation downspeed occurs, the hitless capability of adaptive modulation might remove a need to issue a flow control message to temporarily halt traffic. The traffic could then continue to flow to the modem uninterrupted, to the air interface, and on to the peer wireless node receiver.

Adaptive modulation in conjunction with PFC could also mitigate frame loss on wireless communication links for all priority levels of traffic when the wireless bandwidth available cannot meet the current ingress rate, illustratively an Ethernet input frame rate, by proactively informing the upstream equipment such as a subtending switch that the lower priority Ethernet traffic will be imminently affected by a downshift in modulation, allowing the subtending switch to divert lower priority traffic accordingly. Continued monitoring of Ethernet ingress, in this example, and queue levels comparatively to all available modulation levels and associated wireless bandwidth, can enable a prediction of at which modulation levels lower priority traffic could be affected. If a downshift occurs and the CIR for the lower priority traffic cannot be met, PFC messaging is sent to the subtending switch indicating that the traffic for the lower priority must be paused on the wireless link.

What has been described is merely illustrative of the application of principles of embodiments of the present disclosure. Other arrangements and methods can be implemented by those skilled in the art.

For example, adaptive modulation could be tied to any traffic shaping technique, such as Ethernet traffic shaping techniques, to provide for a more resilient wireless communication network, and one with less Ethernet frame jitter. Adaptive modulation could also or instead be used in combination with differentiated services, weighted fair queuing, and/or random early detection.

It should also be appreciated that the divisions of function represented in FIGS. 2 and 3 are solely for illustrative purposes. Ingress rate monitoring, for instance, could be implemented as a feature in an adaptive modulation engine or module.

In addition, although described primarily in the context of methods and systems, other implementations are also contemplated, as instructions stored on a non-transitory computer-readable medium, for example.

We claim:

1. Communication network equipment comprising:
a modulator to modulate ingress communication traffic for transmission over a wireless communication link;
an adaptive modulation module, operatively coupled to the modulator, to control a modulation rate of modulation to be applied to the ingress communication traffic by the modulator;
a Priority-based Flow Control (PFC) module, operatively coupled to the adaptive modulation module, to control, through PFC messaging with an upstream communication component from which the communication network equipment receives the ingress communication traffic and based on a control input received from the adaptive modulation module, a rate at which the ingress communication traffic is received by the communication network equipment;
an ingress traffic monitor, operatively coupled to the adaptive modulation module, to monitor the rate at which the ingress communication traffic is received, and to determine whether the modulation rate meets the rate at which the ingress communication traffic is received;
wherein the adaptive modulation module is configured to provide the control input to the PFC module to cause the PFC module to transmit PFC messaging to the upstream communication component responsive to a determination by the ingress traffic monitor that the modulation rate does not meet the rate at which the ingress communication traffic is received, and to prevent the PFC module from transmitting PFC messaging to the upstream communication component responsive to a determination by the ingress traffic monitor that the modulation rate meets the rate at which the ingress communication traffic is received.

2. The communication network equipment of claim 1,
the ingress communication traffic being stored in a plurality of traffic queues,
the ingress traffic monitor being configured to monitor the rate at which the ingress communication traffic is received by monitoring fill levels of the plurality of traffic queues.

3. The communication network equipment of claim 1,
the ingress communication traffic being stored in a plurality of traffic queues,
the PFC module transmitting the PFC messaging to cause the upstream communication component to reduce a rate at which it sends ingress traffic associated with one or more particular traffic queues of the plurality of traffic queues, where the adaptive modulation module provides the control input to the PFC module to cause the PFC module to transmit PFC messaging to the upstream communication component.

4. The communication network equipment of claim 1,
the adaptive modulation module being configured to control the modulation rate to be any of a plurality of different modulation rates supported by the modulator;
the ingress traffic monitor being further configured to predict whether any of the plurality of modulation rates would not meet the rate at which the ingress communication traffic is received;

the adaptive modulation module being further configured to provide the control input to the PFC module to cause the PFC module to transmit PFC messaging to the upstream communication component from which the ingress traffic is received, responsive to a determination that the modulation rate to be applied to the ingress communication traffic by the modulator is a modulation rate that the ingress traffic monitor predicts would not meet the rate at which the ingress communication traffic is received.

5. The communication network equipment of claim 1,
the ingress communication traffic comprising traffic respectively associated with a plurality of priorities, the plurality of priorities comprising one or more higher priorities and one or more lower priorities,
the PFC module being configured to control a rate at which ingress traffic associated with the one or more lower priorities is received, in order to reduce jitter in ingress traffic associated with the one or more higher priorities.

6. The communication network equipment of claim 1, the communication network equipment comprising wireless communication network equipment, the wireless communication network equipment comprising:
a wireless communication module comprising the modulator;
a communication module, operatively coupled to the wireless communication module, to enable receipt of the ingress communication traffic over a further communication link.

7. The communication network equipment of claim 6, the further communication link comprising an Ethernet communication link.

8. The communication network equipment of claim 6, the wireless communication module further comprising the adaptive modulation module and the Priority-based Flow Control (PFC) module.

9. A method comprising:
modulating ingress communication traffic received at communication network equipment, for transmission over a wireless communication link;
applying adaptive modulation to control a modulation rate of modulation to be applied to the ingress communication traffic;
applying Priority-based Flow Control (PFC) to control, through PFC messaging with an upstream communication component from which the communication network equipment receives the ingress communication traffic and based on the adaptive modulation, a rate at which the ingress communication traffic is received by the communication network equipment;
monitoring the rate at which the ingress communication traffic is received;
determining whether the modulation rate meets the rate at which the ingress communication traffic is received;
wherein applying PFC comprises transmitting PFC messaging to the upstream communication component responsive to a determination that the modulation rate does not meet the rate at which the ingress communication traffic is received, and preventing transmission of PFC messaging to the upstream communication component responsive to a determination that the modulation rate meets the rate at which the ingress communication traffic is received.

10. The method of claim 9, further comprising:
storing the ingress communication traffic in a plurality of traffic queues,
the monitoring comprising monitoring fill levels of the plurality of traffic queues.

11. The method of claim 9, further comprising:
storing the ingress communication traffic in a plurality of traffic queues,
the transmitting comprising transmitting the PFC messaging to cause the upstream communication component to reduce a rate at which it sends ingress traffic associated with one or more particular traffic queues of the plurality of traffic queues.

12. The method of claim 9,
the applying adaptive modulation comprising controlling the modulation rate to be any of a plurality of different modulation rates,
the method further comprising:
predicting whether any of the plurality of modulation rates would not meet the rate at which the ingress communication traffic is received,
the applying PFC based on the adaptive modulation comprising transmitting PFC messaging to the upstream communication component from which the ingress traffic is received, responsive to a determination that the modulation rate to be applied to the ingress communication traffic is a modulation rate that is predicted not to meet the rate at which the ingress communication traffic is received.

13. The method of claim 9, further comprising:
receiving the ingress communication traffic over a further communication link.

14. The method of claim 13, the further communication link comprising an Ethernet communication link.

15. The method of claim 9,
the ingress communication traffic comprising traffic respectively associated with a plurality of priorities, the plurality of priorities comprising one or more higher priorities and one or more lower priorities,
the applying PFC comprising controlling a rate at which ingress traffic associated with the one or more lower priorities is received, in order to reduce jitter in ingress traffic associated with the one or more higher priorities.

16. A non-transitory computer-readable medium storing instructions which, when executed by a processor, perform a method comprising:
modulating ingress communication traffic received at communication network equipment, for transmission over a wireless communication link;
applying adaptive modulation to control a modulation rate of modulation to be applied to the ingress communication traffic;
applying Priority-based Flow Control (PFC) to control, through PFC messaging with an upstream communication component from which the communication network equipment receives the ingress communication traffic and based on the adaptive modulation, a rate at which the ingress communication traffic is received by the communication network equipment;
monitoring the rate at which the ingress communication traffic is received;
determining whether a modulation rate of the modulation to be applied to the ingress communication traffic meets the rate at which the ingress communication traffic is received;
wherein applying PFC comprises transmitting PFC messaging to the upstream communication component responsive to a determination that the modulation rate does not meet the rate at which the ingress communication traffic is received, and preventing transmission of PFC messaging to the upstream communication component responsive to a determination that the modulation rate meets the rate at which the ingress communication traffic is received.

* * * * *